July 30, 1946.   J. R. PATTEE   2,405,049
APPARATUS FOR DETECTING SMALL DIRECT CURRENTS
Filed Jan. 20, 1944

INVENTOR.
John Robert Pattee
BY
E. C. Sanborn
Attorney

Patented July 30, 1946

2,405,049

UNITED STATES PATENT OFFICE 2,405,049

APPARATUS FOR DETECTING SMALL DIRECT CURRENTS

John Robert Pattee, Waterbury, Conn., assignor to The Bristol Company, Waterbury, Conn., a corporation of Connecticut Application January 20, 1944, Serial No. 518,954

12 Claims. (Cl. 171—119)

This invention relates to the detection of small unidirectional currents, and is concerned with the provision of a novel improved apparatus whereby such currents may be detected and reproduced as alternating currents adapted to amplification for purposes of measurement or control.

The invention is of particular utility in the determination and utilization of small values of unidirectional E. M. F., such, for example, as those derived from thermocouples, bridge circuits, pH meters, and ammeter shunts.

It is an object of the present invention to provide a detecting inverter galvanometer utilizing both a continuous and an alternating magnetic flux in a common air gap, but so disposed as to reduce to a minimum the tendency of alternating flux to traverse that portion of the magnetic circuit in which the continuous magnetomotive force is generated.

It is a further object to provide a device of the above nature having an electrical network in which unidirectional and alternating electromotive forces shall be inherently non-interfering thus eliminating the need for filter circuits to separate the currents of the two classes.

It is a further object to provide a device of the above nature in which the flow of alternating current in the detector circuit shall have a negligible net tendency to deflect the moving element in a sense to modify the normal deflecting influence of the current to be detected.

It is a further object to provide a device of the above nature in which the amplification of the alternating output of the detector system may be materially enhanced by the use of a resonant electrical network.

The foregoing objects are attained while at the same time preserving the advantages of the invention disclosed in the co-pending application of Perry A. Borden, Serial No. 493,714, filed July 7, 1943 (now Patent No. 2,368,701, issued February 6, 1945), over which the present invention is an improvement.

In carrying out the purposes of the invention it is proposed to provide a detector-galvanometer structure having electrical windings movable in a magnetic field possessing both unidirectional and alternating components, and having both its electrical and magnetic circuits subdivided and balanced in a manner to segregate to a maximum extent the respective components, and to neutralize undesired mechanical reactions on the moving element. The segregation and balancing functions are in general effected by a utilization of the "bridge" principle in both the electrical and the magnetic circuits. This is accomplished by so conforming and combining the elements of said circuits that points between which it is desired that there shall be no flow of either unidirectional or alternating components of said currents or magnetic fields, shall be maintained at identical corresponding electrical or magnetic potentials without interruption to continuity of paths for those components which it is desired shall flow between said points.

Other features of the invention will be hereinafter described and claimed.

Figure 3:
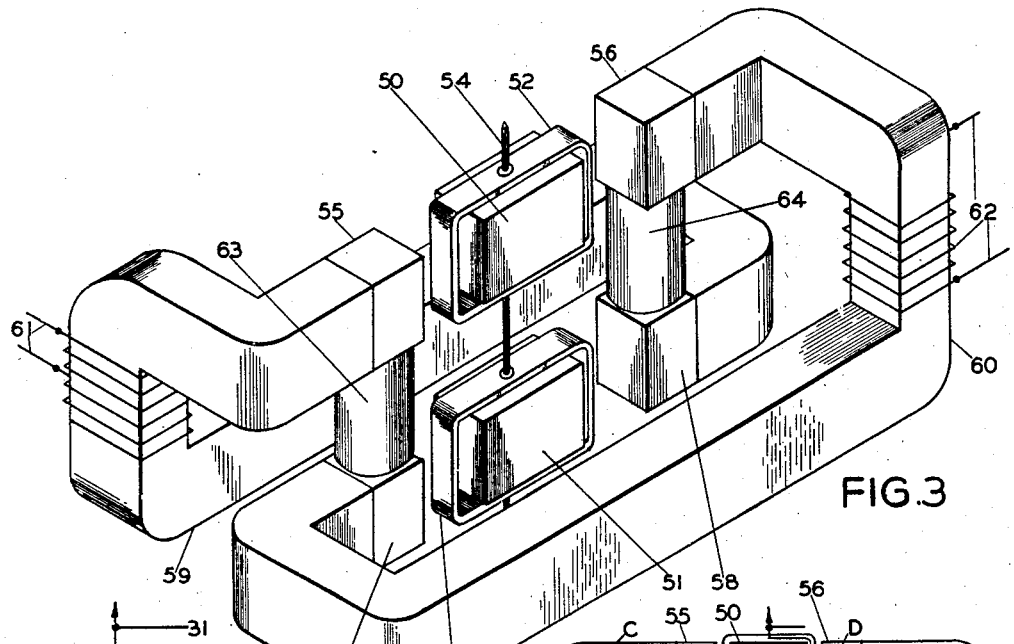
Fig. 3 is a perspective view of an alternative form of instrument embodying the principles of the invention.

Referring now to the drawing:

The numeral 10 designates a U-shaped yoke of ferromagnetic material carrying two inwardly facing permanent magnet elements 11 and 12, preferably formed of "Alnico" or similar high-coervice-force material, upon which in turn are mounted inwardly directed U-shaped pole pieces 13 and 14 formed of laminated ferromagnetic material. The pole piece 13 includes polar projections 15 and 16, and the pole piece 14 includes polar projections 17 and 18, all said polar projections being adapted to receive magnetizing windings of insulated wire. Between the polar projections 15 and 17 is positioned a stationary core 19 of ferromagnetic material, and a similar core 20 is positioned between the polar projections 16 and 18. Surrounding the core 19, and free for deflection through a limited angle, is a coil 21; and surrounding the core 20 is an identical coil 22, said coils both being rigidly attached to a movable element including a pivoted shaft or spindle 23. Placed upon the polar projections 15, 16, 17, and 18 are windings 25, 26, 27, and 28 respectively, electrically connected to each other and to a source of alternating current supply 29, in such a manner that alternating magnetic flux produced by current flowing from said source in one direction in said windings will tend to follow a magnetic circuit in a sense indicated by the arrows A, the lines of force passing from left to right in the upper air gaps at the same time as they are passing from right to left in the lower air gaps as seen in the drawing. When said current flows in the opposite direction in said windings, the direction of said flux will, of course, be opposite to that indicated by said arrows A. The alternating flux thus circulates in a path which, excepting the air gaps, is wholly of soft, laminated ferromagnetic material, and is not required to traverse the material of the permanent magnets 11 and 12. The magnets 11 and 12 being magnetized as indicated by the letters N and S as shown in the drawing, the unidirectional flux produced thereby will tend to flow from left to right through the polar projections 15 and 16, the cores 19 and 20, and the polar projections 17 and 18 as indicated by the arrows B completing its circuit through the yoke 10. With the alternating and unidirectional fluxes thus related, it will be seen that at the instant the components of said representative fluxes are in the same direction in the air gaps associated with the core 19, they will be in opposition in the air gaps associated with the core 20, and that upon reversal of the magnetizing current derived from the A. C. source, the opposite condition will hold true.

The coils 21 and 22 are integrally mounted in such a manner that they will both simultaneously lie in a position of maximum sensitivity of reaction between currents flowing therein and the magnetic flux within the air gaps. This position corresponds to a condition of zero mutual inductance between said coils and the fields in said air gaps, which is equivalent to stating that in said position of maximum sensitivity there will be no linkage between said coils and said magnetic flux. With the unidirectional and alternating components of the magnetic fields occupying a common geometrical position in space, it follows that when the movable coils lie in that position where there exists a maximum sensitivity of deflection due to reaction between a D. C. component of current and the unidirectional component of the field, the alternating component of said field will not induce any corresponding E. M. F. in the windings of the coils.

The electrical connections of the movable coils 21 and 22 may be made in either of two ways, according to the manner in which the principle of the invention is to be utilized. These methods, hereinafter designated as the "first" method and the "second" method respectively will presently be set forth in their relative arrangements and performances. With either scheme, one terminal of each of the movable coils 21 and 22 is connected through suitable flexible leads not shown in the drawing to a common conductor 30; and the free ends of said coils are similarly connected to conductors 31 and 32 respectively.

In the "first" method of applying the principle of the invention, the coils 21 and 22 are interconnected with such relative polarities as to produce a differential effect in reaction upon the unidirectional component of the field in the respective air gaps. That is to say, the connection is made such that a current flowing through said coils in series, as from conductor 31 to conductor 32, and reacting upon the unidirectional component of flux, would tend to produce equal and opposite turning moments upon said coils, with a zero resulting deflecting influence of the movable structure. It will be obvious that with such an arrangement a current entering by the conductor 30, dividing, and leaving the windings of the moving element by conductors 31 and 32, will produce in the coils turning moments in a common direction, tending to deflect the moving element in an angular sense about the spindle 23.

As the moving element is deflected from the position of zero mutual inductance between the movable coils and the magnetic fields, there will become linked with each of the coils 21 and 22 a portion of the field flux in the air gaps, the magnitude of this portion in relation to the total flux increasing within certain limits with the deflection of the moving element about the axis of the spindle 23. While the unidirectional component of the flux, by virtue of its unvarying intensity, will produce no inductive effects due to its linkage with the movable coils, the opposite will hold true for the alternating component of the flux; and each of the movable coils will function as the secondary winding of a transformer and have induced therein an alternating E. M. F. of the same frequency as the field, and of a magnitude dependent upon the extent of deflection of the moving element. With the coils 21 and 22 interconnected in the manner stated (wherein the inductive effects of said coils in series with respect to magnetic fields in the same direction in the two air gaps, as the unidirectional components indicated by arrows B in the drawing, are in opposition), it will be obvious that if the fluxes in the two air gaps are in opposite directions (as indicated by the arrows A in the drawing, and corresponding to the alternating component of the magnetic field), the inductive effects in said two coils will tend to reinforce one another, with a resultant electromotive force appearing between the conductors 31 and 32.

For the purpose of introducing into the coils 21 and 22 a unidirectional E. M. F. to be detected and quantitively represented by an alternating effect of corresponding magnitude, there may be utilized a form of bridge circuit including a transformer 35 having a core portion 36 upon which is wound a primary coil 37 and a secondary coil 38. The primary winding 37 of the transformer 35 is tapped at its middle point and has attached thereto a conductor 41. The extremities of the winding 37 are connected to the conductors 31 and 32. There is thus provided a symmetrical network through which a unidirectional electromotive force derived from a source 42, and impressed between the conductors 30 and 41, will cause a direct current to flow in equal and opposite portions through the two halves of the winding 37 on the transformer 35, and through the movable coils 21 and 22. The components of direct current flowing in the two sections of the winding 37 will tend mutually to neutralize and will produce no net magnetizing effect upon the core 36. Said components flowing in the windings 21 and 22, connected as hereinbefore set forth, will be additive in their torque-producing effects and will tend to cause the movable structure to be angularly deflected in a direction and to a degree dependent upon the direction and magnitude respectively of the direct current flowing in said windings. The E. M. F. set up between the conductors 31 and 32 due to the linkage of the alternating component of the flux in the air gaps with the movable coils 21 and 22 will be applied to the extremities of the primary winding 37 on the transformer 35, and will cause a corresponding alternating E. M. F. to be developed between the terminals of the secondary winding 38. At the same time, any alternating current which may flow through the circuit formed by the transformer winding 37 and the movable coils 21 and 22 will react in opposite senses on the unidirectional component of flux in the air gaps associated with the respective coils, so that any tendency of one coil to assume a vibratory motion will be exactly offset by that in the other coil, with a zero resultant tendency for the movable coil structure to oscillate as a unit.

Figure 1:
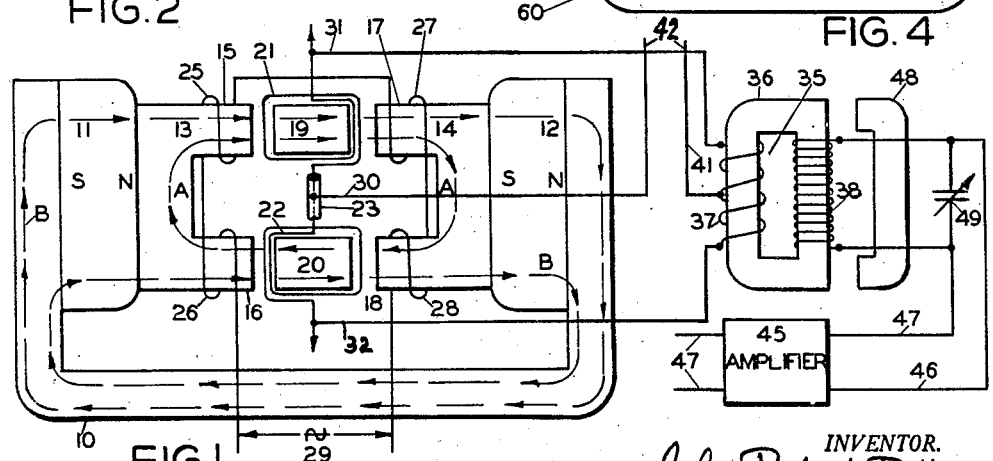
Fig. 1 is a side elevation, partially diagrammatic, of a galvanometer and associated circuit embodying the principles of the invention.

The alternating E. M. F. developed in the winding 38 may be utilized either with or without amplification, as may be desired; but in general it will be expedient that some form of amplification be applied to said E. M. F. before efficient use may be made of its characteristics. In Fig. 1, the numeral 45 designates an amplifying unit which may be of any conventional type, utilizing the principle of the electronic tube, or of the magnetic saturation amplifier, or of other devices known to the art, and whose manner of functioning forms no part of the present invention. Conductors 46 and 47 provide connection between the terminals of the secondary winding 38 and the input side of the amplifier 45; and from output connections 47 may be derived an E. M. F. corresponding to that set up in the winding 38 of the transformer 35, and at a materially higher power level than is available at said transformer terminals. Said output E. M. F. may be applied, for example, to the operation of a potentiometer of the self-balancing class, or any other conventional indicating, recording or controlling mechanism, as will be readily apparent.

The transformer 35 may be said to perform a three fold function, as follows:

(1) To provide suitable matching of impedance between the A.-C. potential source (windings 21 and 22) and such amplifying device as it may be found expedient to employ.

(2) To combine the two elements of A.-C. power derived from the windings 21 and 22, so that their sum may be amplified by a single amplifying unit.

(3) To segregate the direct and alternating components of current flowing in the electrical network, so that the former will not influence the performance of the amplifier or associated apparatus.

The degree of amplification may be greatly increased by the introduction of means to render the output circuit of the transformer 35 resonant to the fundamental frequency of said output. For this purpose, it is essential that said output circuit include reactive elements whereby said resonant condition may be established. Variable inductance may be incorporated in the system by providing an adjustable magnetic shunt 48 and a variable condenser 49, both shown in Fig. 1. By suitably proportioning the relative values of inductance and capacitance associated with these reactive units, the output circuit of the transformer 35 may be made resonant, with the desired greatly increased degree of amplification. While the magnitude of alternating current drawn from the moving coil system by a suitable amplifier would ordinarily be so small as to produce no appreciable mechanical reaction upon the magnetic fields, there remains the further consideration that the tendency of such current would be to depart by a large phase angle from the inducing voltage; and, when amplification is effected by the use of resonant circuit, the alternating component of the current flowing in the moving coils will approach a quadrature relationship with the inducing field, with a consequent tendency to reduce to zero any electromagnetic reaction between said component and said field.

Figures 2, 4:
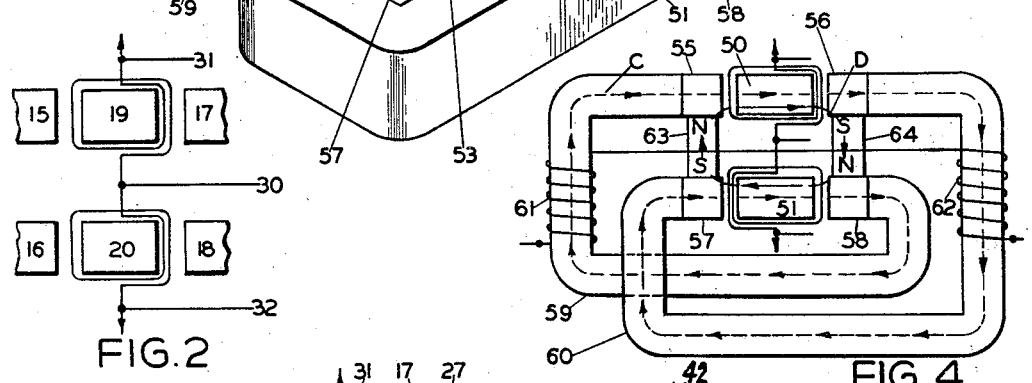
Fig. 2 shows a portion of the electrical connections of a form of the invention alternative to that shown in Fig. 1.
Fig. 4 is a diagram indicating magnetic and electrical relationships existing in the form of instrument shown in Fig. 3.

While a diagrammatic representation of the apparatus necessary to apply the "second" method of utilizing the principles of the invention differs from that exemplifying the "first" method only to the extent shown in Fig. 2, where the relative polarities of the coils 21 and 22 are reversed with respect to the relationship shown in Fig. 1, in actual practice it is found that, whereas the "first" method requires a galvanometer design of high sensitivity, and relatively long period, the "second" method, involving synchronous vibration of the galvanometer element lends itself to the use of a galvanometer designed to have a short period of response, but not necessarily of a high degree of sensitivity.

The result of the reversal of coil polarities shown in Fig. 2, as compared with the arrangement indicated in Fig. 1, is that current entering by conductor 30, dividing and leaving the windings of the moving element by conductors 31 and 32, and reacting on the unidirectional component of the flux (which component flows in the same direction in the air gaps associated with both coils) will tend to produce equal and opposite torques in said coils with a zero resultant turning movement on the movable structure. At the same time, such a direct current in its reaction on the alternating component of the field (in which the flux passes in opposite directions in the air gaps associated with the respective coils) will tend to cause both coils to be angularly deflected in the same sense at the same time, so that their turning movements will combine to produce a vibrating or oscillatory effect on the moving element. The moving element will thus tend to act in a manner similar to that of the conventional electro-magnetic oscillograph and will vibrate in synchronism with the alternating component of the field and with an intensity dependent upon the value of direct current flowing in the windings.

The oscillatory motion of the conductors of the coils 21 and 22 in the magnetic fields existing in the air gaps will cause E. M. F.'s to be set up in said windings; and from inspection it will be apparent that the E. M. F.'s due to vibration of the coils in the unidirectional component of the fields will be additive in the two windings, so that the alternating E. M. F. set up in the coil 21 will be in phase with that set up in the coil 22, and the two voltages will combine in their tendency to cause an alternating current to circulate between the conductors 31 and 32. There is thus produced between said conductors an alternating E. M. F. of magnitude representative of the value of the unidirectional E. M. F. derived from the circuit under measurement; and this alternating voltage may be utilized, and if desired amplified, in a manner identical to that set forth in the form of the invention illustrated in Fig. 1. As in the case of an induced E. M. F. in the moving coils, the effect of amplification by means of a resonant circuit upon the E. M. F. set up by vibration of the coils will be to shift the alternating component of the current flowing in said coils to a phase position in quadrature with their motion, with a consequent tendency to reduce to zero any modifying electromagnetic effect of said current upon said vibratory movement.

In Figs. 3 and 4 is shown a form of galvanometer embodying the principles of the invention but differing from the form shown in Fig. 1 by virtue of an alternative arrangement of the magnetic system. Two stationary cores 50 and 51 formed of ferro-magnetic material are adapted to be encircled respectively by the coils 52 and 53 of a movable element in which said coils are integrally mounted upon a rotatable spindle 54, said coils being axially displaced along said spindle. Juxtaposed to the core 50 at opposite extremities thereof, and forming therewith air gaps in which the coil 52 may move through a limited deflection, are pole-pieces 55 and 56; and similarly juxtaposed to the core 51 are pole-pieces 57 and 58, all said pole pieces being formed of ferromagnetic material, and preferably of laminated construction. Joining the pole-pieces 55 and 58, which are "diagonally" disposed with respect to the cores 50 and 51, is a yoke 59 formed of ferromagnetic material and preferably laminated for the purpose of carrying an alternating flux. A similar yoke 60 forms a magnetic circuit between the alternate pole-pieces 56 and 57. Wound upon suitable portions of the yokes 59 and 60 are magnetizing coils 61 and 62 adapted to be interconnected in a manner to impel flux through the magnetic circuit formed by the pole-piece 55, the core 50, the pole-piece 56, the yoke 60, the pole-piece 57, the core 51, the pole-piece 58 and the yoke 59, together with the intervening air gaps, thus completing a magnetic circuit through the several ferromagnetic elements in the order named, as indicated by the arrows C in Fig. 4, and adapted to alternating magnetization under the influence of an alternating current flowing in the coils 61 and 62.

Joining the pole-pieces 55 and 57, is a permanent magnet member 63, preferably formed of "Alnico" or similar high-coercive-force material; and joining the pole pieces 55 and 58 is a similar permanent magnet member 64. The permanent magnets 63 and 64 have their polarities so selected that under their joint influence a magnetic flux will pass from the pole-piece 55 through the adjacent air gap to the core 50 and through the adjacent air gap to the pole-piece 56, and will return from the pole-piece 58 through the adjacent air gap to the core 51 and through the adjacent air gap to the pole piece 57. The path of the unidirectional flux will be as indicated by the arrows D in Fig. 4. Because the pole-pieces 55 and 58, terminating the yoke 59, are both in contact with similar poles of the permanent magnet members, it follows that if these members be magnetized to equal strengths, there will be no tendency for unidirectional flux to follow the path established by said yoke; and for a similar reason no unidirectional flux will pass through the yoke 60. Said yokes, therefore, will not have any shunting effect on the permanent magnet members 63 and 64. Also, because of the symmetry of the magnetic structure, and provided the coils 61 and 62 be made to produce equal magnetizing effects upon the yokes 59 and 60, the pole-pieces 55 and 57 will be at a common alternating magnetic potential, and no alternating magnetomotive force will exist between the ends of the permanent magnet member 63 or between the ends of the permanent magnet member 64, with the result that there will be no tendency for alternating flux to pass through those portions of the magnetic circuit in which the continuous magnetomotive force is generated. It will further be seen that at the instant the unidirectional and alternating fluxes are in the same direction in the core 50 and air gaps adjacent thereto, said fluxes will be in opposition in the core 51 and air gaps adjacent thereto.

The coils 52 and 53 being connected in the manner shown in Fig. 4, which is the same as the manner in which the coils 21 and 22 shown in Fig. 1 are interconnected, and the fields in the respective air gaps being as indicated, it will be obvious that the performance of the combination indicated in Figs. 3 and 4, in so far as the reactions in the moving windings in response to the application of an E. M. F. to the network are concerned, will be the same as that hereinbefore described with the coil arrangement shown in Fig. 2 substituted for the arrangement shown in Fig. 1, the coil structure partaking of an oscillatory motion and thereby causing alternating potentials to be generated by virtue of relative motion of the conductors and the unidirectional component of the magnetic field. It will further be apparent that if the relative connections of the coils 52 and 53 be made as shown in Fig. 2, the performance of the combination, with respect to reactions of the movable windings and potentials induced therein will be the same as set forth in the explanation of the form of the invention shown in Fig. 1.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for responding to unidirectional current to be detected and producing an alternating E. M. F. representative thereof, comprising a magnetizable structure having at least two air gaps, means for producing in said gaps magnetic fluxes having simultaneous unidirectional and alternating components, the instantaneous polarity relation of the alternating to the unidirectional component in one of said gaps being the reverse of that in the other of said gaps, coils mounted for deflection in said gaps, connections for supplying direct current to said coils for reaction with one of said flux components to deflect said coils, and means for responding to alternating potential developed in said coils by the other of said flux components upon deflection of said coils.

2. Apparatus for responding to unidirectional current to be detected and producing an alternating E. M. F. representative thereof, comprising a magnetizable structure having at least two air gaps, means for producing in said gaps magnetic fluxes having simultaneous unidirectional and alternating components, the instantaneous polarity relation of the alternating to the unidirectional component in one of said gaps being the reverse of that in the other of said gaps, coils mounted for deflection in said gaps, said coils being electrically interconnected so that direct current supplied thereto will divide between said coils and will react with one of said flux components to deflect said coils, and means for responding to alternating potential developed in said coils by the other of said flux components upon deflection of said coils.

3. Apparatus for responding to unidirectional current to be detected and producing an alternating E. M. F. representative thereof, comprising a magnetizable structure having at least two air gaps, means for producing in said structure and in said gaps a unidirectional magnetic field, means for superimposing an alternating component upon said field, the instantaneous polarity relation of said alternating component to said unidirectional field in one of said gaps being the reverse of that in the other of said gaps, movable coils in said gaps and forming an integral structure whereby said coils may be deflected only as a unit, means for causing said direct current to traverse said coils in a manner to produce similar and mutually reinforcing deflecting effects in said coils when reacting upon one of said magnetic field components, and means for causing alternating E. M. F.'s inductively developed in said coils by the other of said field components and in response to said deflecting effects to be mutually reinforcing.

4. Apparatus for responding to unidirectional current to be detected and producing an alternating E. M. F. representative thereof, comprising a magnetizable structure having at least two air gaps, means for producing in said structure and in said gaps a unidirectional magnetic field, means for superimposing an alternating component upon said field, the instantaneous polarity relation of said alternating component to said unidirectional field in one of said gaps being the reverse of that in the other of said gaps, movable coils in said gaps and forming an integral structure whereby said coils may be deflected only as a unit, a circuit for causing said direct current to divide and traverse said coils in a sense to produce similar and mutually reinforcing deflecting effects in the same when reacting upon one of said magnetic field components, said circuit also being adapted to combine in a mutually reinforcing sense alternating E. M. F.'s inductively developed in said coils by the other of said field components and in response to said deflecting effects.

5. In combination, two similar galvanometer elements each having a stationary magnetizable structure and an electrical winding movable in the field thereof, said windings being electrically connected at one point and mechanically interconnected to form an integral deflectable unit, means for producing in the fields of said magnetizable structures magnetic fluxes having simultaneous alternating and unidirectional components in which the instantaneous polarity relation of said alternating component to said unidirectional component, in the field of one, is the reverse of that in the field of the other of said structures, an electrical circuit including said windings whereby a current entering the same at the point of electrical connection and dividing to flow therethrough will by its reaction on one of the field components produce similar and mutually reinforcing deflecting effects on the coil unit, while potentials inductively developed in said respective windings by the other of said field components and in response to said deflecting effects will tend to be mutually reinforcing.

6. In combination, two similar galvanometer elements each having a stationary magnetizable structure and an electrical winding movable in the field thereof, said windings being electrically interconnected at one point and mechanically interconnected to form an integral deflectable unit, means for producing in the fields of the magnetizable structure magnetic fluxes having simultaneous alternating and unidirectional components in which the instantaneous polarity relation of said alternating component to said unidirectional component, in the field of one, is the reverse of that in the field of the other of said structures, a transformer having a winding divided into two sections by a center tap, a bridge network having said sections as two adjacent arms and said movable windings as its other two adjacent arms, and connections whereby a unidirectional E. M. F. to be detected may be applied between said center tap and the point of interconnection of said windings.

7. Apparatus for responding to unidirectional current to be detected and producing an alternating E. M. F. representative thereof, comprising a magnetizable structure having at least two air gaps, means for producing in said structure and in said gaps a unidirectional magnetic field, means for superimposing an alternating component upon said field, the instantaneous polarity relation of said alternating component to said unidirectional field in one of said gaps being the reverse of that in the other of said gaps, movable coils in said gaps and forming an integral structure whereby said coils may be deflected only as a unit, said coils being interconnected so that a direct current to be detected will divide between the same and in each coil will react on the unidirectional component of the flux to produce a turning moment in the same direction, whereby said coil structure will be angularly deflected to an extent dependent upon the magnitude of said current and will consequently link with the alternating component of flux in its associated air gap, together with circuit means whereby the combined effect of the alternating potentials induced in said coils may be utilized.

8. Apparatus for responding to unidirectional current to be detected and producing an alternating E. M. F. representative thereof, comprising a magnetizable structure having at least two air gaps, means for producing in said structure and in said gaps a unidirectional magnetic field, means for superimposing an alternating component upon said field, the instantaneous polarity relation of said alternating component to said unidirectional field in one of said gaps being the reverse of that in the other of said gaps, movable coils in said gaps and forming an integral structure whereby said coils may be deflected only as a unit, said coils being interconnected so that a direct current to be detected will divide between the same and in each coil will react on the alternating component of the flux to produce simultaneous similar turning moments whereby said coil structures will be subjected to an oscillatory motion having an amplitude dependent upon the magnitude of said direct current and, due to the vibratory action of its windings upon the unidirectional component of flux in its associated air gaps, will have alternating potentials generated therein, together with circuit means whereby the combined effect of said alternating potentials may be utilized.

9. In combination, a mangetizable structure having at least two gaps and comprising two branches forming paths having said gaps in common, one of said branches being adapted to transmit alternating, and the other of said branches unidirectional, magnetic flux, said branches having such conformation and respective disposition that magnetomotive forces developed in the second of said branches due to alternating flux in the first will mutually annul, with a resultant zero tendency for alternating flux to pass through said second path, and means for producing alternating and unidirectional fluxes in said first and second paths respectively, together with a movable member comprising mechanically united but electrically independent conducting windings in said respective gaps and adapted for limited motion therein in response to the reaction between unidirectional currents in said windings and one component of the flux in said gaps and to have alternating electromotive forces induced therein by interaction between said windings and the other component of said flux.

10. In combination, a magnetizable structure having at least two gaps and comprising two branches forming paths having said gaps in common, one of said branches being adapted to transmit alternating, and the other of said branches unidirectional, magnetic flux, said branches having such conformation and respective disposition that magnetomotive forces developed in the second of said branches due to alternating flux in the first will mutually annul, with a resultant zero tendency for alternating flux to pass through said second path, and magnetomotive forces developed in the first of said branches due to unidirectional flux in the second will similarly annul, with a resultant zero tendency for unidirectional flux to pass through said first path, and means for producing alternating and unidirectional fluxes in said first and second paths respectively, together with a movable member comprising mechanically united but electrically independent conducting windings in said respective gaps and adapted for limited motion therein in response to the reaction between unidirectional currents in said windings and one component of the flux in said gaps and to have alternating electromotive forces induced therein by interaction between said windings and the other component of said flux.

11. In combination, a magnetizable structure having at least two gaps and comprising two branches forming paths having said gaps in common, one of said branches being adapted to transmit alternating, and the other of said branches unidirectional, magnetic flux, said branches having such conformation and respective disposition that magnetomotive forces developed in the second of said branches due to alternating flux in the first will mutually annul, with a resultant zero tendency for alternating flux to pass through said second path, and means for producing alternating and unidirectional fluxes in said first and second paths respectively, together with a movable member comprising mechanically united but electrically independent conducting windings in said respective gaps and adapted for limited motion therein in response to the reaction between unidirectional currents in said windings and one component of the flux in said gaps and to have alternating electromotive forces induced therein by interaction between said windings and the other component of said flux, and an electrical network including said windings and having at a common unidirectional potential at least two points between which exists an alternating potential, and at a common alternating potential at least two other points between which exists a unidirectional potential.

12. In combination, a magnetizable structure having at least two gaps and comprising two branches forming paths having said gaps in common, one of said branches being adapted to transmit alternating, and the other of said branches unidirectional, magnetic flux, said branches having such conformation and respective disposition that magnetomotive forces developed in the second of said branches due to alternating flux in the first will mutually annul, with a resultant zero tendency for alternating flux to pass through said second path, and magnetomotive forces developed in the first of said branches due to unidirectional flux in the second will similarly annul, with a resultant zero tendency for unidirectional flux to pass through said first path, and means for producing alternating and unidirectional fluxes in said first and second paths respectively, together with a movable member comprising mechanically united but electrically independent conducting windings in said respective gaps and adapted for limited motion therein in response to the reaction between unidirectional currents in said windings and one component of the flux in said gaps and to have alternating electromotive forces induced therein by interaction between said windings and the other component of said flux, and an electrical network including said windings and having at a common unidirectional potential at least two points between which exists an alternating potential, and at a common alternating potential at least two other points between which exists a unidirectional potential.

JOHN ROBERT PATTEE.